US010382605B2

(12) United States Patent
Sasaki

(10) Patent No.: US 10,382,605 B2
(45) Date of Patent: Aug. 13, 2019

(54) VEHICULAR INFORMATION PROCESSING SYSTEM, VEHICLE-MOUNTED DEVICE, METHOD FOR PROVIDING TEXT DATA, AND PROGRAM FOR PROVIDING THE SAME

(71) Applicant: TOYOTA JIDOSHA KABUSHIKI KAISHA, Toyota-shi, Aichi (JP)

(72) Inventor: Akira Sasaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/565,789

(22) PCT Filed: Apr. 13, 2016

(86) PCT No.: PCT/JP2016/002002
§ 371 (c)(1),
(2) Date: Oct. 11, 2017

(87) PCT Pub. No.: WO2016/166977
PCT Pub. Date: Oct. 20, 2016

(65) Prior Publication Data
US 2018/0124227 A1    May 3, 2018

(30) Foreign Application Priority Data
Apr. 16, 2015  (JP) .................. 2015-084262

(51) Int. Cl.
*H04M 1/60* (2006.01)
*H04W 4/80* (2018.01)
(Continued)

(52) U.S. Cl.
CPC .......... *H04M 1/6083* (2013.01); *G06F 3/167* (2013.01); *G10L 15/265* (2013.01);
(Continued)

(58) Field of Classification Search
None
See application file for complete search history.

(56) References Cited

U.S. PATENT DOCUMENTS 6,507,643 B1 * 1/2003 Groner .................. H04L 51/066
379/88.14
7,103,154 B1 * 9/2006 Cannon ............... H04M 1/6505
379/32.01
(Continued)

FOREIGN PATENT DOCUMENTS

JP    2002-257574 A    9/2002
JP    2005-268971 A    9/2005
(Continued)

OTHER PUBLICATIONS

"Message Access Profile", Tel & Car Working Group, version 12 (Jul. 16, 2013), pp. 13-15.

*Primary Examiner* — Vladimir Magloire
*Assistant Examiner* — Donald H B Braswell
(74) *Attorney, Agent, or Firm* — Hunton Andrews Kurth LLP

(57) ABSTRACT

Provided is a system in which a vehicle-mounted device and a mobile device are connected using a communication protocol. The vehicle-mounted device includes: a storage unit that stores information indicating whether or not an e-mail transmitting function specified in the communication protocol is incorporated; a control unit that determines, according to an instruction for transmitting an e-mail to the mobile device, whether or not the mobile device is equipped with the e-mail transmitting function, on the basis of the information in the storage unit; and a processing unit that transmits text, for e-mail, generated by the vehicle-mounted device, to the mobile device, and instructs the mobile device to generate an electronic mail according to the text for e-mail and transmit the electronic mail to an external network when (Continued)

the e-mail transmitting function is incorporated, and that instructs the mobile device to generate text for e-mail when the e-mail transmitting function is not incorporated. The mobile device includes: a text generating unit that generates the text for e-mail according to the instruction, for text generation, from the vehicle-mounted device; and a control unit that transmits, to the external network, an electronic mail based on the generated text for e-mail.

9 Claims, 5 Drawing Sheets

(51) Int. Cl.
*G10L 15/26* (2006.01)
*H04W 4/12* (2009.01)
*H04M 1/725* (2006.01)
*G06F 3/16* (2006.01)
*H04M 11/00* (2006.01)

(52) U.S. Cl.
CPC ..... *H04M 1/7253* (2013.01); *H04M 1/72552* (2013.01); *H04M 11/00* (2013.01); *H04W 4/12* (2013.01); *H04W 4/80* (2018.02)

(56) References Cited

U.S. PATENT DOCUMENTS

| | | |
|---|---|---|
| 2005/0208981 A1 | 9/2005 | Kawasaki |
| 2007/0140187 A1 | 6/2007 | Rokusek et al. |
| 2011/0121991 A1* | 5/2011 | Basir ................ G08G 1/0962 340/902 |
| 2012/0196583 A1 | 8/2012 | Kindo |
| 2013/0005258 A1 | 1/2013 | Uefuji et al. |
| 2013/0084847 A1* | 4/2013 | Tibbitts ............... H04W 8/245 455/419 |
| 2015/0382133 A1* | 12/2015 | Vandeweerd ....... G01C 21/362 455/41.2 |
| 2016/0111090 A1* | 4/2016 | Holdren .............. G10L 15/20 704/251 |

FOREIGN PATENT DOCUMENTS

| | | |
|---|---|---|
| JP | 2009-300537 A | 12/2009 |
| JP | 2013-012825 A | 1/2013 |
| JP | 5635522 B2 | 12/2014 |
| WO | 2011/043072 A1 | 4/2011 |

* cited by examiner

VEHICULAR INFORMATION PROCESSING SYSTEM, VEHICLE-MOUNTED DEVICE, METHOD FOR PROVIDING TEXT DATA, AND PROGRAM FOR PROVIDING THE SAME

CROSS-REFERENCE TO RELATED APPLICATIONS

This is a national phase application based on the PCT International Patent Application No. PCT/JP2016/002002 filed Apr. 13, 2016, claiming priority to Japanese Patent Application No. 2015-084262 filed Apr. 16, 2015, the entire contents of both of which are incorporated herein by reference.

TECHNICAL FIELD

The present invention relates to a vehicular information processing system in which a vehicle-mounted device and a mobile device are connected using a communication protocol, the vehicle-mounted device, a method for providing text data, and a program for providing text data, the method and the program being performed in the system.

BACKGROUND ART

Various systems have been proposed in which portable-type mobile devices (for example, smartphones, cell phones, and tablet PCs) are connected to vehicle-mounted devices (for example, car navigation devices) mounted on vehicles so that the vehicle-mounted devices and the mobile devices communicate with each other. For example, Patent Literature 1, Patent Literature 2, Patent Literature 3, and Patent Literature 4 can be referred to.

In the systems disclosed in the Patent Literatures, the vehicle-mounted device and the mobile device are connected with each other using a predetermined communication protocol such as Bluetooth (registered trademark) or Wi-Fi (registered trademark). In these systems, the mobile device transmits information stored in the mobile device to the vehicle-mounted device so that the information is used by the vehicle-mounted device, and the vehicle-mounted device transmits information stored in the vehicle-mounted device to the mobile device so that the information is used by the mobile devices, for example.

For example, a message access profile (MAP) for exchange of message objects between devices is provided in the Bluetooth communication protocol. The use of a function specified in the MAP allows the contents of an electronic mail received by a mobile device to be displayed on a screen of a vehicle-mounted device or read as audio by the vehicle-mounted device and allows a message generated by the vehicle-mounted device to be transmitted in electronic mail format from the mobile device to an external network, for example.

CITATION LIST

Patent Literature

[PTL 1] Japanese Laid-Open Patent Publication No. 2002-257574
[PTL 2] Japanese Laid-Open Patent Publication No. 2005-268971
[PTL 3] Japanese Laid-Open Patent Publication No. 2009-300537
[PTL 4] Japanese Patent No. 5635522

SUMMARY OF THE INVENTION

Problems to be Solved by the Invention

In the conventional system described above, however, there may be cases in which the mobile device is not equipped with a function (text data processing function) for receiving, interpreting, and processing text data generated by the vehicle-mounted device. In these cases, the mobile device is not capable of properly receiving, interpreting, and processing the text data provided from the vehicle-mounted device.

For example, the Bluetooth MAP communication protocol specifies a function (e-mail receiving function) of providing, to a vehicle-mounted device, text data of an electronic mail received by a mobile device from an external network and a function (e-mail transmitting function) of allowing a mobile device to perform a process of receiving text data, for e-mail transmission, which is provided from a vehicle-mounted device and then transmitting the text data in an electronic mail format to an external network. This e-mail transmitting function corresponds to the text data processing function, but the e-mail transmitting function is an optionally supported function on a mobile device side.

Thus, even when a communication link is established between a mobile device and a vehicle-mounted device using the Bluetooth MAP communication protocol, if the mobile device is not equipped with the MAP e-mail transmitting function, a situation occurs in which the text data, for e-mail transmission, generated by the vehicle-mounted device is not transmitted by the mobile device as an electronic mail to an external network.

The present invention is made in view of the aforementioned problem, and an object of the present invention is to construct a vehicular information processing system which allows convenience for providing text data from a vehicle-mounted device to a mobile device to be improved for the mobile device which is not equipped with the text data processing function.

Solution to the Problems

In order to solve the aforementioned problem, a first aspect of the present disclosure is a vehicular information processing system that includes a vehicle-mounted device and a mobile device, and in which the vehicle-mounted device and the mobile device are connected using a communication protocol. The vehicle-mounted device includes: a storage unit that stores information indicating whether or not the mobile device is equipped with an e-mail transmitting function specified in the communication protocol; a control unit that determines, when an operation of making an instruction for transmitting an e-mail to the mobile device is inputted, whether or not the mobile device is equipped with the e-mail transmitting function, on the basis of the information in the storage unit; and a processing unit that transmits text data, for e-mail transmission, generated by the vehicle-mounted device, to the mobile device, and instructs the mobile device to generate an electronic mail according to the text data for e-mail transmission and transmit the electronic mail to an external network when the mobile device is equipped with the e-mail transmitting function, and that instructs the mobile device to generate text data for e-mail transmission when the mobile device is not equipped with the e-mail transmitting function. The mobile device includes: a text generating unit that generates the text data for e-mail transmission according to the instruction, for text data generation, from the vehicle-mounted device; and a control unit that transmits, to the external network, an electronic mail based on the text data, for e-mail transmission, generated by the text generating unit.

In the vehicular information processing system according to the first aspect, for the mobile device connected to the vehicle-mounted device, information indicating whether or not the mobile device is equipped with the e-mail transmitting function specified in the communication protocol is stored in the storage unit. When there are a plurality of mobile devices that can be connected to the vehicle-mounted device, the information is stored for each of the mobile devices. When the vehicle-mounted device receives an operation of making an instruction for transmitting an e-mail to the mobile device, the vehicle-mounted device determines, on the basis of the information in the storage unit, whether or not the mobile device is equipped with the e-mail transmitting function, and selects the optimal method for providing the text data for e-mail transmission. When the mobile device is equipped with the e-mail transmitting function, the vehicle-mounted device transmits the text data, for e-mail transmission, generated by the vehicle-mounted device itself, to the mobile device, and instructs the mobile device to generate an electronic mail according to the text data for e-mail transmission and transmit the electronic mail to the external network. Meanwhile, when the mobile device is not equipped with the e-mail transmitting function, the vehicle-mounted device instructs the mobile device to generate the text data for e-mail transmission and causes the mobile device to generate the text data for e-mail transmission. The mobile device generates the text data for e-mail transmission according to the instruction from the vehicle-mounted device and transmits, to the external network, the electronic mail based on the generated text data for e-mail transmission.

Thus, for the mobile device equipped with a text generating function, the text data for e-mail transmission can be provided from the vehicle-mounted device to the mobile device regardless of whether or not the mobile device is equipped with the e-mail transmitting function specified in the communication protocol used to connect between the vehicle-mounted device and the mobile device.

In a second aspect of the present disclosure based on the first aspect, the text generating unit of the mobile device includes an audio recognition function and generates the text data for e-mail transmission by performing a process of recognizing sound inputted from outside of the mobile device.

In the vehicular information processing system according to the second aspect, the mobile device has the audio recognition function. Therefore, the mobile device is capable of recognizing sound received from outside of the mobile device using the audio recognition function to generate the text data for e-mail transmission. Thus, the mobile device is capable of easily generating the text data for e-mail transmission.

In a third aspect of the present disclosure based on the second aspect, the vehicle-mounted device further includes an audio output unit which converts text to audio and outputs the audio, and the audio output unit outputs sound recognizable through the audio recognition function of the mobile device as the text data, for e-mail transmission, to be provided to the mobile device, when the mobile device is not equipped with the e-mail transmitting function.

In the vehicular information processing system according to the third aspect, the vehicle-mounted device outputs, to the mobile device, the text data, for e-mail transmission, to be provided to the mobile device, in audio format. Therefore, the mobile device is capable of recognizing sound received from the vehicle-mounted device, using the audio recognition function, to generate the text data for e-mail transmission. Thus, it is possible to easily provide the text data for e-mail transmission from the vehicle-mounted device to the mobile device.

In a fourth to a sixth aspects of the present disclosure based on the first to the third aspects, respectively, the predetermined communication protocol is a MAP communication protocol based on a Bluetooth standard.

In the vehicular information processing system according to the fourth to the sixth aspects, the vehicle-mounted device and the mobile device are connected using the MAP communication protocol based on the Bluetooth standard. The e-mail transmitting function specified in the MAP communication protocol is optional, and there are cases in which the mobile device is not equipped with the e-mail transmitting function. In the present invention, whether or not the mobile device is equipped with the e-mail transmitting function is determined, and the optimal method for providing the text data, for e-mail transmission, of the electronic mail is selected. Thus, for the mobile device equipped with the text generating function, the text data, for e-mail transmission, of the electronic mail can be provided from the vehicle-mounted device to the mobile device regardless of whether or not the mobile device is equipped with the e-mail transmitting function specified in the MAP communication protocol used to connect between the vehicle-mounted device and the mobile device.

A seventh aspect of the present disclosure is a vehicle-mounted device which connects to a mobile device using a communication protocol. The vehicle-mounted device includes: a storage unit that stores information indicating whether or not the mobile device is equipped with an e-mail transmitting function specified in the communication protocol; a control unit that determines, when an operation of making an instruction for transmitting an e-mail to the mobile device is inputted, whether or not the mobile device is equipped with the e-mail transmitting function, on the basis of the information in the storage unit; a processing unit that transmits text data, for e-mail transmission, generated by the vehicle-mounted device, to the mobile device, and instructs the mobile device to generate an electronic mail according to the text data for e-mail transmission and transmit the electronic mail to an external network when the mobile device is equipped with the e-mail transmitting function, and that makes an instruction for starting up an audio recognition function incorporated in the mobile device when the mobile device is not equipped with the e-mail transmitting function; and an audio output unit that outputs sound recognizable through the audio recognition function of the mobile device as text data, for e-mail transmission, to be provided to the mobile device, when the mobile device is not equipped with the e-mail transmitting function.

In the vehicle-mounted device according to the seventh aspect, for the mobile device connected thereto, information indicating whether or not the mobile device is equipped with the e-mail transmitting function specified in the communication protocol is stored in the storage unit. When there are a plurality of connectable mobile devices, the information is stored for each of the mobile devices. When the vehicle-mounted device receives an operation of making an instruction for transmitting an e-mail to the mobile device, the vehicle-mounted device determines, on the basis of the information in the storage unit, whether or not the mobile device is equipped with the e-mail transmitting function, and selects the optimal method for providing the text data for e-mail transmission. When the mobile device is equipped with the e-mail transmitting function, the vehicle-mounted device transmits the text data, for e-mail transmission, generated by the vehicle-mounted device itself, to the mobile device, and instructs the mobile device to generate the electronic mail according to the text data for e-mail transmission and transmit the electronic mail to the external network. Meanwhile, when the mobile device is not equipped with the e-mail transmitting function, the vehicle-mounted device instructs the mobile device to generate the text data for e-mail transmission, and outputs, as sound recognizable through the audio recognition function of the mobile device, the text data, for e-mail transmission, to be provided to the mobile device.

Thus, for the mobile device equipped with the text generating function, the text data for e-mail transmission can be provided from the vehicle-mounted device to the mobile device regardless of whether or not the mobile device is equipped with the e-mail transmitting function specified in the communication protocol used to connect between the vehicle-mounted device and the mobile device.

An eighth aspect of the present disclosure is a method for providing text data for e-mail transmission, the method being performed in a vehicular information processing system in which a vehicle-mounted device and a mobile device are connected using a communication protocol. In the method, the vehicle-mounted device performs the steps of: obtaining, from the mobile device, information indicating whether or not the mobile device is equipped with an e-mail transmitting function specified in the communication protocol, and storing the information in a storage unit; detecting that an operation of making an instruction for transmitting an e-mail to the mobile device is inputted to the vehicle-mounted device; determining, when detecting the operation, whether or not the mobile device is equipped with the e-mail transmitting function, on the basis of the information in the storage unit; transmitting text data, for e-mail transmission, generated by the vehicle-mounted device, to the mobile device, and instructing the mobile device to generate an electronic mail according to the text data for e-mail transmission and transmit the electronic mail to an external network when determining that the mobile device is equipped with the e-mail transmitting function; and instructing the mobile device to generate text data for e-mail transmission when determining that the mobile device is not equipped with the e-mail transmitting function. The mobile device performs the steps of: generating the text data for e-mail transmission according to the instruction, for text data generation, from the vehicle-mounted device; and transmitting, to the external network, an electronic mail based on the generated text data for e-mail transmission.

With this method for providing text data for e-mail transmission, it is possible to obtain the effect and advantage of the vehicular information processing system according to the first aspect described above.

A ninth aspect of the present disclosure is a program for providing text data for e-mail transmission, the program causing a computer of the vehicle-mounted device and the mobile device to perform the method, according to the eighth aspect, for providing text data for e-mail transmission.

With this program for providing text data for e-mail transmission, the effect and advantage of the method, according to the eighth aspect described above, for providing text data for e-mail transmission can be obtained by the program being executed by the computer. This program may be stored in a semiconductor memory such as a ROM, a RAM, and a flash memory, a magnetic disk memory such as a flexible disc and a hard disc, an optical disc memory such as a CD-ROM, a DVD, and a BD, and a recording medium such as a memory card.

Advantageous Effects of the Invention

As described above, with the vehicular information processing system according to the present invention, for the mobile device equipped with the text generating function, the text data for e-mail transmission can be provided from the vehicle-mounted device to the mobile device regardless of whether or not the mobile device is equipped with the e-mail transmitting function specified in the communication protocol used to connect between the vehicle-mounted device and the mobile device. Thus, for the mobile devices which is not equipped with the e-mail transmitting function, it is possible to improve the convenience for providing the text data for e-mail transmission, from the vehicle-mounted device, to the mobile device.

DESCRIPTION OF EMBODIMENTS

[Outline]

According to the present invention, in a system in which a mobile device (such as a smartphone) is connected to a vehicle-mounted device (such as a car navigation device), the convenience for providing text data from the vehicle-mounted device to the mobile device is improved. When text data is provided to the mobile device, the vehicle-mounted device determines whether or not the mobile device is equipped with a text data receiving function. When the mobile device is equipped with the text data receiving function, the vehicle-mounted device itself generates the text data and transmits the text data to the mobile device. Meanwhile, when the mobile device is not equipped with the text data receiving function, the vehicle-mounted device starts up a text generating function of the mobile device and causes the mobile device to generate the text data. This processing improves the convenience for the mobile device equipped with the text generating function because the vehicle-mounted device can provide the text data to the mobile device regardless of whether or not the mobile device is equipped with the text data receiving function.

[Intrinsic Configuration of System]

Figure 1:
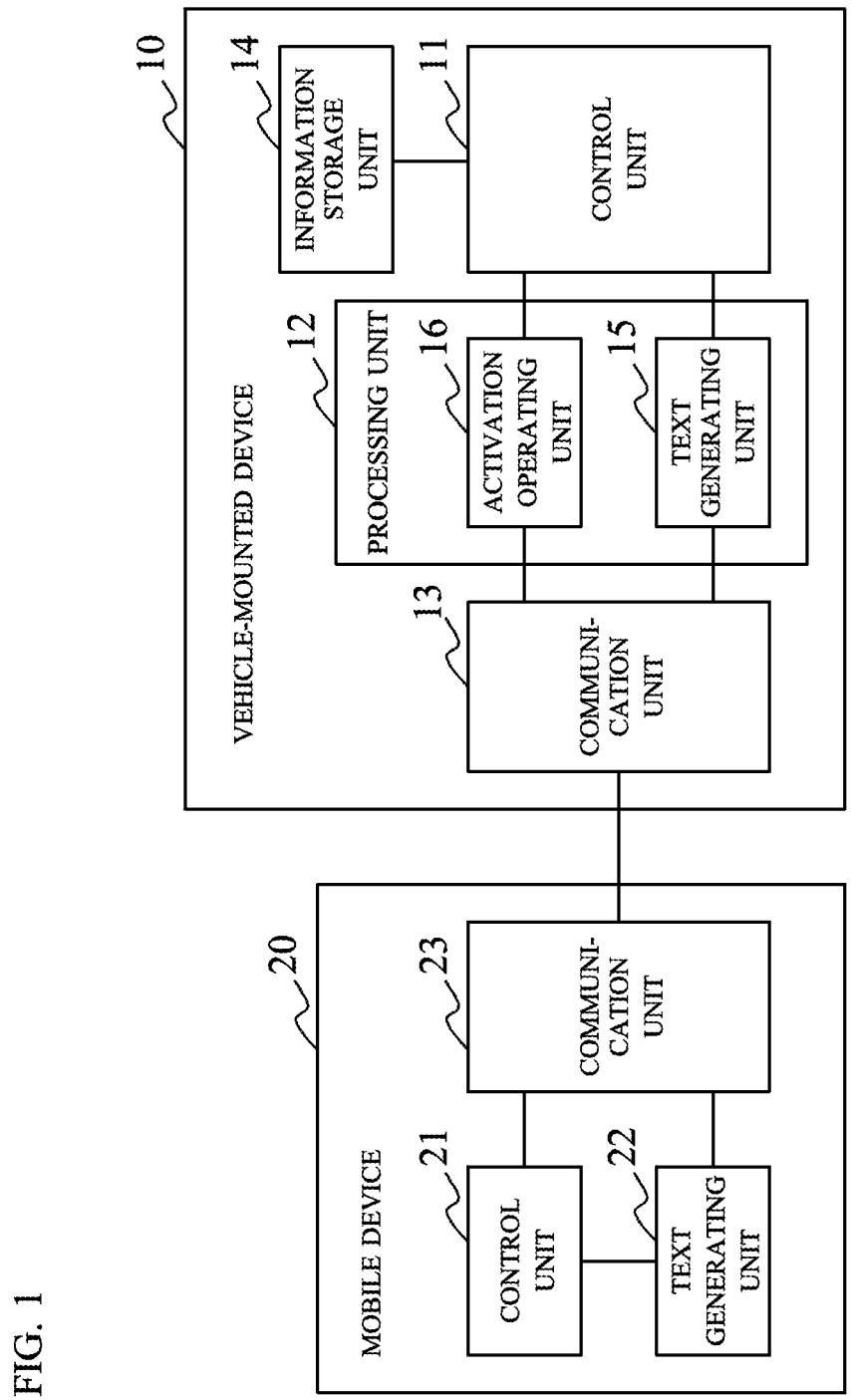
FIG. 1 illustrates an intrinsic configuration of a vehicular information processing system according to the present invention.

Firstly, an intrinsic configuration of a vehicular information processing system provided by the present invention will be described. FIG. 1 illustrates the intrinsic configuration of the vehicular information processing system according to the present invention.

As illustrated in FIG. 1, the vehicular information processing system according to the present invention is configured to include a vehicle-mounted device 10 and a mobile device 20. The vehicle-mounted device 10 includes a control unit 11, a processing unit 12, a communication unit 13, and an information storage unit 14. The processing unit 12 includes a text generating unit 15 and an activation operating unit 16. The mobile device 20 includes a control unit 21, a text generating unit 22, and a communication unit 23.

The vehicle-mounted device 10 is, for example, a device mounted on a vehicle, such as a car navigation device. The vehicle-mounted device 10 may be a stationary device secured to a vehicle body or may be a portable-type device which can be carried out of the vehicle. The mobile device 20 is, for example, a portable-type device such as a smartphone, a cell phone, or a tablet PC. The vehicular information processing system of the present embodiment is constructed by, for example, the vehicle-mounted device 10 and the mobile device 20 being close to each other within a range in which communication therebetween can be made as a result of, for example, the mobile device 20 being carried in a vehicle having the vehicle-mounted device 10 mounted therein.

The vehicle-mounted device 10 and the mobile device 20 are capable of performing short-range communication using a predetermined communication protocol. Examples of the short-range communication include near-field wireless communication using, for example, a Bluetooth or Wi-Fi communication protocol and wired near-field communication with the use of a communication protocol using MirrorLink (registered trademark) or a USB.

The vehicle-mounted device 10 will be described. The control unit 11 is a so-called central portion, of the vehicle-mounted device 10, which performs a part or the entirety of various functions (applications) with which the vehicle-mounted device 10 is equipped. The functions with which the vehicle-mounted device 10 is equipped include an electronic mailing function, a driving assistance function, a route navigation function, an audio recognition function, a music playing function, and the like. The text generating unit 15 generates text data on the basis of an instruction from the control unit 11. The activation operating unit 16 outputs an operation signal for activating the text generating unit 22 mounted on the mobile device 20, on the basis of an instruction from the control unit 11. This operation signal includes, for example, a signal for an operation of starting up the text generating unit 22 and a signal for an operation of generating the text data. The communication unit 13 is a communication interface for establishing connection with the communication unit 23 of the mobile device 20 through the short-range communication. The communication unit 13 transmits, to the mobile device 20, the text data generated by the text generating unit 15 and the operation signal outputted by the activation operating unit 16, for example. Furthermore, the communication unit 13 receives data, signals, etc., transmitted from the mobile device 20. The information storage unit 14 is configured by, for example, a rewritable non-volatile memory, and stores at least information indicating whether or not the mobile device 20 is equipped with a function (hereinafter referred to as a "text data processing function"), for receiving, interpreting, and processing the text data, which is specified in the communication protocol used to connect between the vehicle-mounted device 10 and the mobile device 20. This information can be obtained, for example, when the mobile device 20 is connected to the vehicle-mounted device 10 for the first time. When there are a plurality of the mobile devices 20 that can be connected to the vehicle-mounted device 10, information indicating whether or not the mobile device 20 is equipped with the text data processing function is stored for each of the mobile devices 20.

The control unit 11, the text generating unit 15, and the activation operating unit 16 in the vehicle-mounted device 10 are typically implemented by a central processing unit (CPU) and a memory having a program stored therein. When the CPU reads, interprets, and executes a predetermined program stored in the memory, the functions as the control unit 11, the text generating unit 15, and the activation operating unit 16 as described above are implemented.

The mobile device 20 will be described. The control unit 21 is a so-called central portion, of the mobile device 20, which performs a part or the entirety of various functions (applications) which are incorporated in the mobile device 20 and with which the mobile device 20 is equipped. The functions which are incorporated in the mobile device 20 and with which the mobile device 20 is equipped include an electronic mailing function, an audio recognition function, a scheduling function, a reminder function, a music playing function, a camera function, and the like. The text generating unit 22 generates text data on the basis of an instruction from the control unit 21 or an instruction received from the vehicle-mounted device 10 via the communication unit 23. The communication unit 23 is a communication interface for establishing connection with the communication unit 13 of the vehicle-mounted device 10 through the short-range communication. The communication unit 23 transmits various data to the vehicle-mounted device 10 according to instructions from the control unit 21. Furthermore, the communication unit 23 receives data, signals, etc., transmitted from the vehicle-mounted device 10.

The control unit 21 and the text generating unit 22 in the mobile device 20 are typically implemented by a CPU and a memory having a program stored therein. When the CPU reads, interprets, and executes a predetermined program stored in the memory, the functions as the control unit 21 and the text generating unit 22 as described above are implemented.

[Essential Processing Performed by System]

Figure 2:
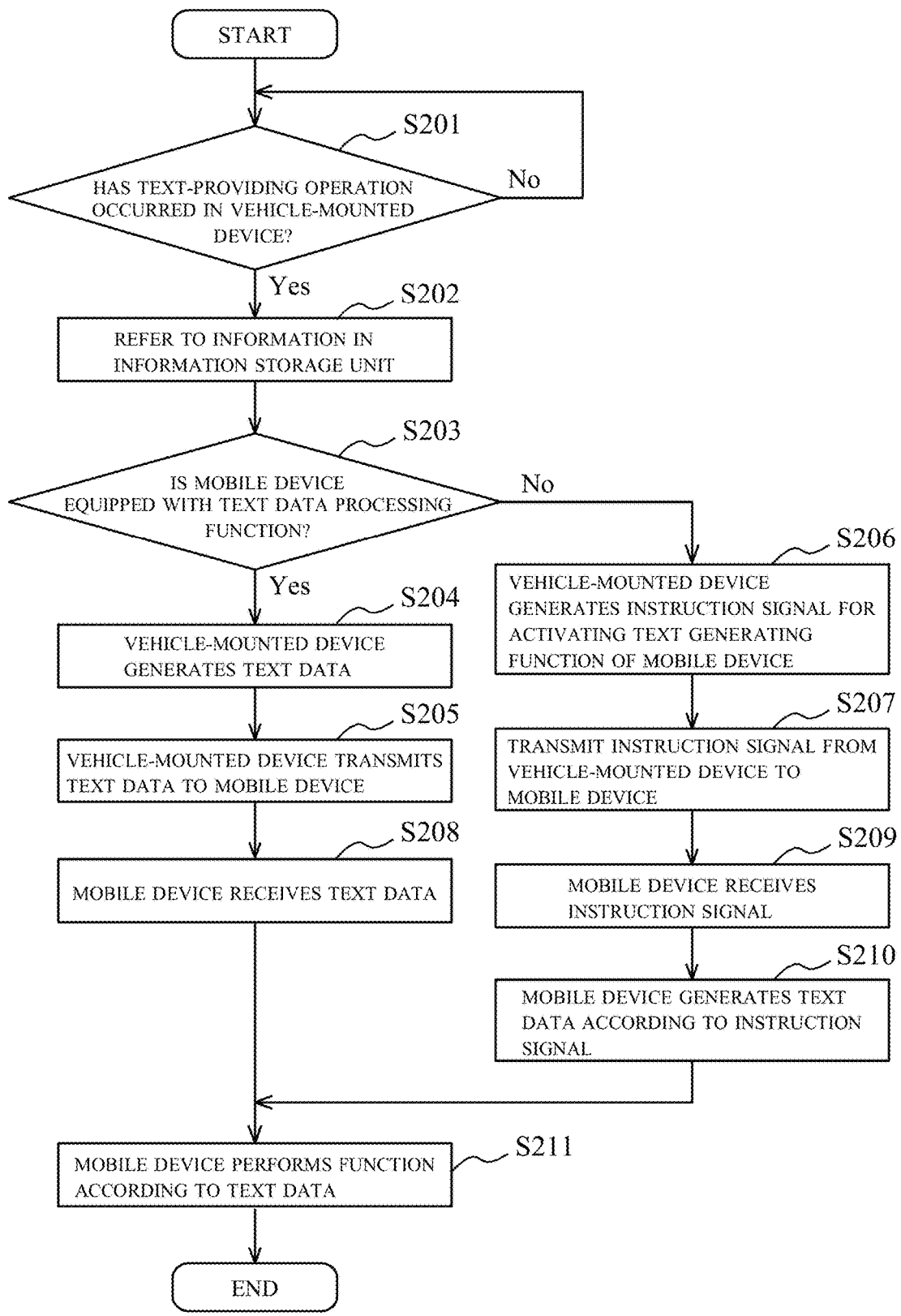
FIG. 2 is a flowchart showing a procedure of essential processing, for addressing a problem to be solved, which is performed by the vehicular information processing system according to the present invention.

Next, essential processing performed by the vehicular information processing system having the above-described configuration according to the present invention will be described. FIG. 2 is a flowchart showing a procedure of essential processing, for addressing the problems to be solved, which is performed by the vehicular information processing system according to the present invention.

The processing in the flowchart shown in FIG. 2 is started, for example, by the communication unit 13 of the vehicle-mounted device 10 and the communication unit 23 of the mobile device 20 being connected with each other through the short-range communication. When the processing has been started, the control unit 11 of the vehicle-mounted device 10 performs monitoring as to whether or not an operation (hereinafter referred to as a "text-providing operation") of instructing the vehicle-mounted device 10 to provide text data to the mobile device 20 occurs (step S201). When the occurrence of the text-providing operation is detected (in step S201, Yes), the control unit 11 refers to information stored in the information storage unit 14 (step S202). Then, the control unit 11 determines whether or not the mobile device 20 is equipped with the text data processing function specified in the communication protocol used to connect between the vehicle-mounted device 10 and the mobile device 20 (step S203).

When the result of the determination in step S203 described above indicates that the mobile device 20 is equipped with the text data processing function (in step S203, Yes), the control unit 11 instructs the text generating unit 15 to generate text data. On the basis of this instruction, the text generating unit 15 generates text data corresponding to the text-providing operation (step S204). The generated text data is sent to the communication unit 13, and the communication unit 13 of the vehicle-mounted device 10 transmits the text data to the mobile device 20 (step S205).

Meanwhile, when the result of the determination in step S203 described above indicates that the mobile device 20 is not equipped with the text data processing function (in step S203, No), the control unit 11 instructs the activation operating unit 16 to output an operation signal for activating the text generating unit 22 mounted in the mobile device 20. On the basis of this instruction, the activation operating unit 16 generates the operation signal for activating the text generating unit 22 mounted in the mobile device 20 (step S206). The generated operation signal is sent to the communication unit 13, and the communication unit 13 of the vehicle-mounted device 10 transmits the operation signal to the mobile device 20 (step S207).

In the mobile device 20 equipped with the text data processing function, the communication unit 23 receives the text data transmitted from the vehicle-mounted device 10 (step S208). After the communication unit 23 sends the received text data to the control unit 21, the control unit 21 performs a function corresponding to the text data (step S211).

Meanwhile, in the mobile device 20 which is not equipped with the text data processing function, the communication unit 23 receives the operation signal transmitted from the vehicle-mounted device 10 (step S209). The communication unit 23 sends the received operation signal (via the control unit 21 or directly) to the text generating unit 22. The text generating unit 22 receives the operation signal, then starts up the text generating function, and generates the text data (step S210). A method for causing the text generating unit 22 to generate the text data will be described in a specific embodiment described below. After the text data generated by the text generating unit 22 is sent to the control unit 21, the control unit 21 performs a function corresponding to the text data (step S211).

In the processing described above, the process steps of steps S201 to S207 are performed by the vehicle-mounted device 10, and the process steps of steps S208 to S211 are performed by the mobile device 20.

[Essential Effect and Advantage of System]

Thus, in the vehicular information processing system according to the present invention, when the mobile device 20 is equipped with the text data processing function, text data is generated by the vehicle-mounted device 10 and then sent to the mobile device 20. Meanwhile, when the mobile device 20 is not equipped with the text data processing function, the mobile device 20 is instructed to generate the text data in the mobile device 20. Thus, for the mobile device 20 equipped with the text generating function, the text data can be provided from the vehicle-mounted device 10 to the mobile device 20 regardless of whether or not the mobile device 20 is equipped with the text data processing function specified in the communication protocol used to connect between the vehicle-mounted device 10 and the mobile device 20. Accordingly, the convenience for providing text data from the vehicle-mounted device 10 to the mobile device 20 improves.

Specific Embodiment

Hereinafter, a specific embodiment using the vehicular information processing system according to the present invention will be described with reference to the drawings.

Figure 3:
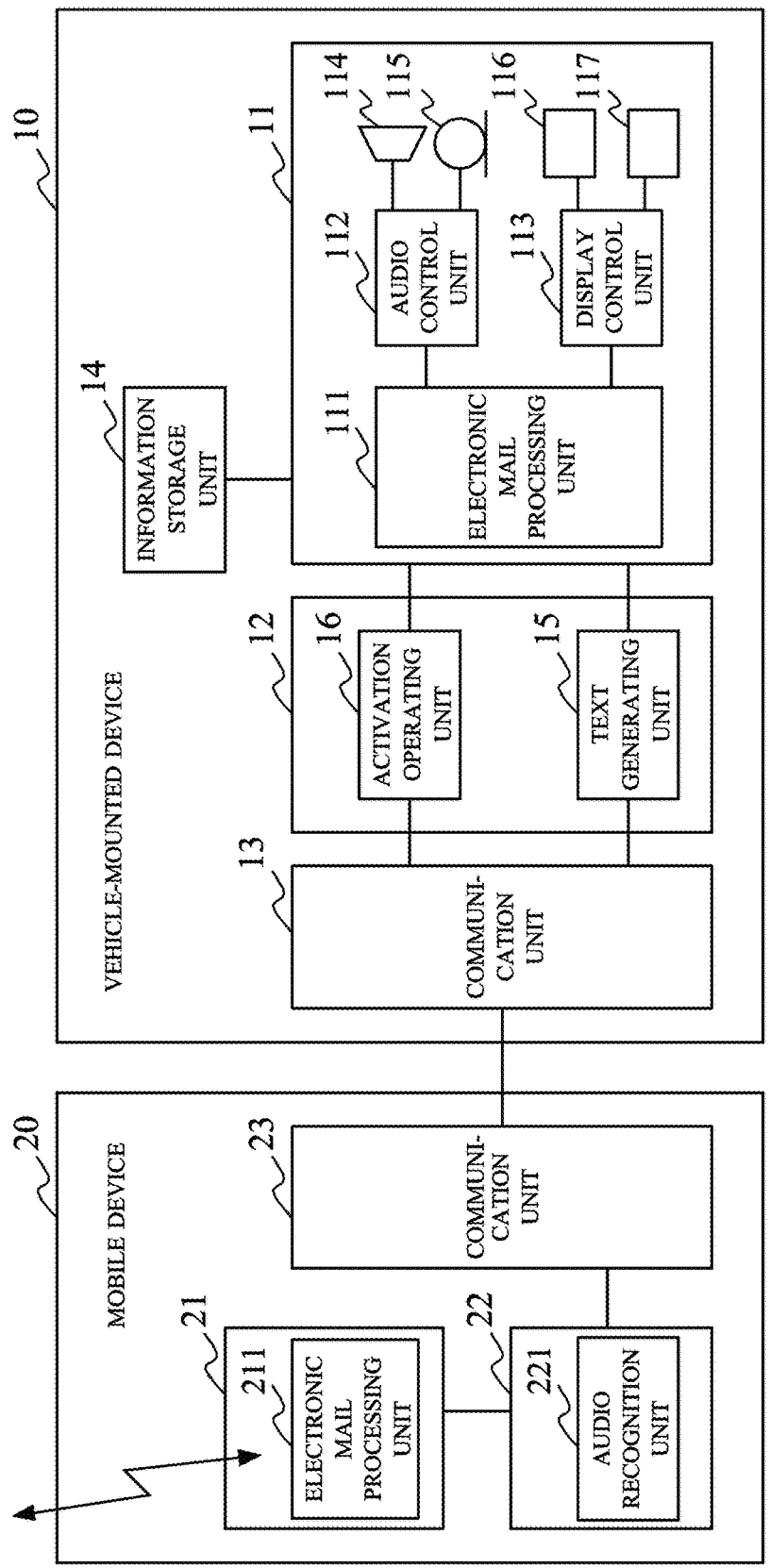
FIG. 3 illustrates a specific configuration of a vehicular information processing system according to one embodiment of the present invention.

FIG. 3 illustrates a specific configuration of a vehicular information processing system according to one embodiment of the present invention. In the present embodiment, an example will be described in which, between the vehicle-mounted device 10 that is a car navigation device and the mobile device 20 that is a smartphone, near-field wireless communication for transmission and reception of electronic mails using the Bluetooth MAP communication protocol is performed. In the present embodiment, an "e-mail transmitting function" described below corresponds to the "text data processing function" described above.

1. System Configuration

As illustrated in FIG. 3, the vehicular information processing system according to the present embodiment includes, as the control unit 11 of the vehicle-mounted device 10 illustrated in FIG. 1, an electronic mail processing unit 111, an audio control unit 112, a display control unit 113, a speaker 114, a microphone 115, a display unit 116, and an input unit 117. Furthermore, the vehicular information processing system includes an electronic mail processing unit 211 as the control unit 21 of the mobile device 20 illustrated in FIG. 1. In addition, the vehicular information processing system includes an audio recognition unit 221 as the text generating unit 22 of the mobile device 20 illustrated in FIG. 1.

In the mobile device 20, the electronic mail processing unit 211 transmits and receives an electronic mail to and from a partner device (such as another mobile device and a personal computer) via an external network such as the Internet and a telephone line network. Specifically, the electronic mail processing unit 211 receives, over the external network, an electronic mail addressed to the mobile device 20 and transmitted from the partner device, and processes the received electronic mail (performs storing of data, notification of incoming e-mails, displaying of the contents, data transfer, and the like). Furthermore, on the basis of data indicated by a user, etc., of the mobile device 20 or data indicated by a driver, etc., of the vehicle-mounted device 10, the electronic mail processing unit 211 generates an electronic mail addressed to the partner device and transmits the generated electronic mail to the external network.

The audio recognition unit 221 recognizes sound emitted toward the mobile device 20 and generates, from the recognized sound, text data that can be represented as a string of characters. Well-known audio recognition technology can be used for the audio recognition unit 221. The audio recognition unit 221 may have a function of obtaining audio data transmitted from the vehicle-mounted device 10 via the communication unit 23 and converting the obtained audio data to text data.

The communication unit 23 used in the present embodiment establishes a communication link by performing a pairing (registering) process with the communication unit 13 of the vehicle-mounted device 10 so that the mobile device 20 and the vehicle-mounted device 10 are wirelessly connected using the Bluetooth MAP communication protocol. In accordance with the e-mail receiving function in the MAP communication protocol, the communication unit 23 transmits the text data, etc., of the electronic mail received by the electronic mail processing unit 211, to the vehicle-mounted device 10, in response to a request from the vehicle-mounted device 10. Furthermore, when the mobile device 20 is equipped with the e-mail transmitting function in the MAP communication protocol, the communication unit 23 receives the text data, for e-mail transmission, provided from the vehicle-mounted device 10 and transmits the text data to the electronic mail processing unit 211 in response to a request from the vehicle-mounted device 10.

In the vehicle-mounted device 10, the communication unit 13 used in the present embodiment registers the mobile device 20 as a device with which communication is to be performed, by performing a Bluetooth pairing process with the communication unit 23 of the mobile device 20. After the mobile device 20 is registered through the pairing process as the device with which communication is to be performed, the vehicle-mounted device 10 establishes, by using the Bluetooth MAP communication protocol, wireless connection with the mobile device 20 that is close to the vehicle-mounted device 10 such that a distance therebetween is a predetermined distance. In accordance with the e-mail receiving function in the MAP communication protocol, the communication unit 13 receives the text data, etc., of the electronic mail transmitted from the mobile device 20. Furthermore, in accordance with the e-mail transmitting function in the MAP communication protocol, the communication unit 13 transmits, to the mobile device 20, the text data, for e-mail transmission, generated by the text generating unit 15. In addition, in accordance with another Bluetooth communication protocol, the communication unit 13 transmits, to the mobile device 20, the operation signal outputted by the activation operating unit 16.

The electronic mail processing unit 111 receives text data, etc., of an electronic mail from the mobile device 20 and provides the message included in the electronic mail to a driver, etc., of the vehicle via the audio control unit 112 and/or the display control unit 113. When the electronic mail processing unit 111 receives an instruction for transmitting an e-mail, from the driver, etc., of the vehicle, via the audio control unit 112 and/or the display control unit 113, the electronic mail processing unit 111 determines, on the basis of a predetermined determination described below, whether to cause the text generating unit 15 to generate text data, for e-mail transmission, of the contents indicated in the instruction, or to cause the activation operating unit 16 to output an operation signal for causing the mobile device 20 to generate the text data for e-mail transmission.

The audio control unit 112 converts, to audio data, the electronic mail message received from the mobile device 20, and outputs the audio data to the speaker 114. The speaker 114 reproduces the e-mail message as audio according to the audio data inputted from the audio control unit 112. Thus, the contents of the e-mail message can be provided to the driver, etc., of the vehicle. The audio control unit 112 and the speaker 114 are configured to function as an audio output unit which converts, to audio, text such as an electronic mail massage and outputs the audio. Furthermore, the audio control unit 112 converts, to a message, audio data based on the voice of the driver, etc., inputted through the microphone 115. The message resulting from the conversion is sent from the audio control unit 112 to the electronic mail processing unit 111. The audio control unit 112 and the microphone 115 are configured to function as an audio input unit which converts sound to text such as an electronic mail message and outputs the text.

The display control unit 113 converts, to image data, the electronic mail message received from the mobile device 20, and outputs the image data to the display unit 116. The display unit 116 is, for example, a display device such as a liquid-crystal display or an organic EL display. The display unit 116 displays, on the screen, the e-mail message according to the image data inputted from the display control unit 113. Thus, the contents of the e-mail message can be provided to the driver, etc., of the vehicle. Furthermore, the display control unit 113 interprets an instruction, from the driver, which is inputted via the input unit 117, and converts the contents of the instruction to a message. The input unit 117 is configured to receive an operation of the driver and input an instruction based on the operation. The input unit 117 includes a remote controller having press buttons, a touch-panel-type input device, and the like. The input unit 117 may be configured integrally with the display unit 116. The message resulting from the conversion is sent from the display control unit 113 to the electronic mail processing unit 111.

FIG. 3 illustrates the speaker 114, the microphone 115, the display unit 116, and the input unit 117 as elements included in the vehicle-mounted device 10. These elements, however, may be provided independently as an input/output device separate from the vehicle-mounted device 10.

Information for at least one mobile device 20 that can be connected using the Bluetooth MAP communication protocol is registered in the information storage unit 14 used in the present embodiment. Furthermore, for each mobile device 20 registered, a function, among the functions provided by the MAP communication protocol, with which the mobile device is equipped is stored. In the present embodiment, at least a state of the mobile device as obtained in a manner described below, which indicates whether or not the mobile device is equipped with the e-mail transmitting function according to the MAP communication protocol, is stored. E-mail address book data necessary for transmitting and receiving electronic mails may be stored in the information storage unit 14.

2. MAP Communication Protocol

Bluetooth SIG (https://www.bluetooth.org/en-us) presents the specifications Ver 1.2 for "message access profile (MAP)", which is one of the Bluetooth communication protocols.

To summarize, the functions mainly implemented in accordance with the MAP are as follows:

(1) a function, by the mobile device 20, of notifying the vehicle-mounted device 10 that a new electronic mail (message) has arrived;

(2) a function (e-mail receiving function), by the vehicle-mounted device 10, of browsing the electronic mails stored in the mobile device 20 and obtaining a necessary electronic mail;

(3) a function, by the vehicle-mounted device 10, of uploading, to the mobile device 20, an electronic mail requested to be transmitted;

(4) a function, by the vehicle-mounted device 10, of deleting an electronic mail stored in the mobile device 20; and (5) a function (e-mail transmitting function), by the mobile device 20, of transmitting, to a network, an electronic mail requested by the vehicle-mounted device 10 to be transmitted.

In the MAP, an electronic mail (message) is transmitted in the following procedure. Firstly, an electronic mail (message), for transmission, uploaded by the vehicle-mounted device 10 is stored in a virtual message folder "outbox" generated in the mobile device 20. The mobile device 20 performs an electronic mail transmission process for the electronic mail stored in the outbox folder. Then, when the mobile device 20 completes the electronic mail transmission process, the electronic mail stored in the outbox folder is transferred to a "send" folder.

Here, since the aforementioned function (5) (e-mail transmitting function) of the MAP is optional, whether or not to support the function (5) depends on the specifications of the mobile device 20. Usually, the outbox folder is not generated in the mobile device 20 for which the function (5) is not supported.

Thus, in the present embodiment, the vehicle-mounted device 10 determines "whether or not the mobile device 20 is equipped with the e-mail transmitting function", on the basis of whether or not the outbox folder has been generated in the mobile device 20. The vehicle-mounted device 10 can use the folder browsing process (GetFolderListing) specified in the MAP communication protocol, to determine whether or not the outbox folder has been generated in the mobile device 20. In principle, the folder browsing process is performed after the vehicle-mounted device 10 and the mobile device 20 are wirelessly connected through a Bluetooth paring process at the beginning. The information storage unit 14 of the vehicle-mounted device 10 stores information indicating whether or not the mobile device 20 is equipped with the e-mail transmitting function, according to the result of determination on the presence or absence of the outbox folder.

3. System Processing

Figure 4:
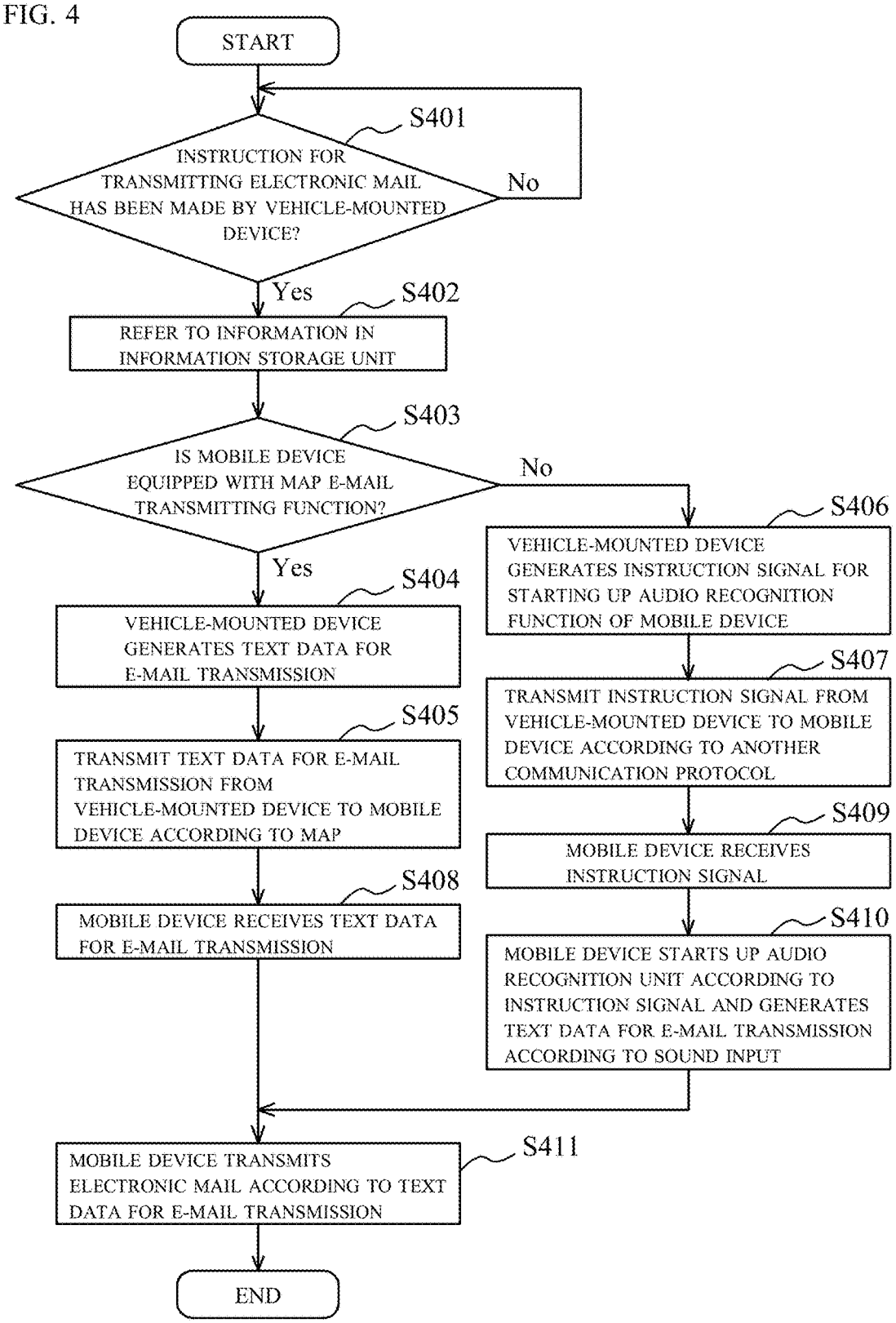
FIG. 4 is a flowchart showing a procedure of processing performed by the vehicular information processing system according to one embodiment of the present invention.
Figure 5:
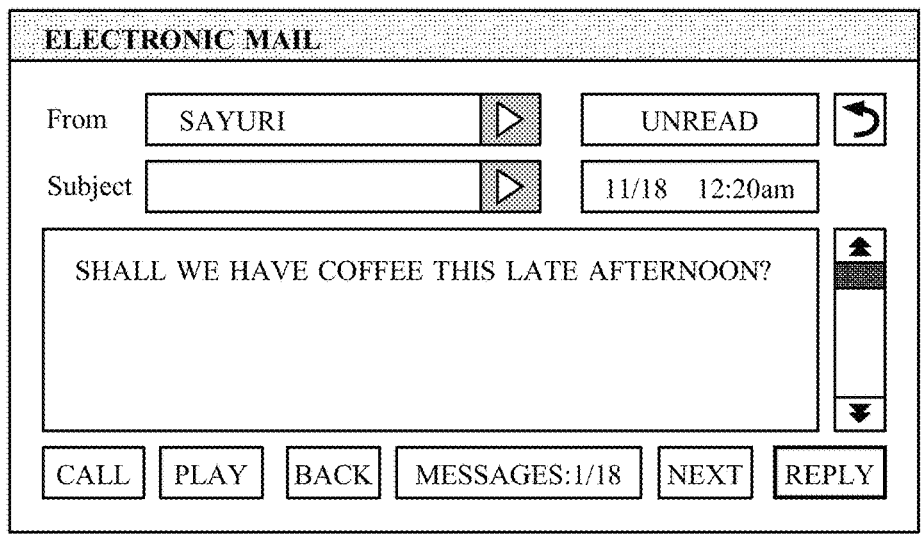
FIG. 5 illustrates one example of an electronic mail operation screen displayed on a display unit of a vehicle-mounted device.
Figure 6:
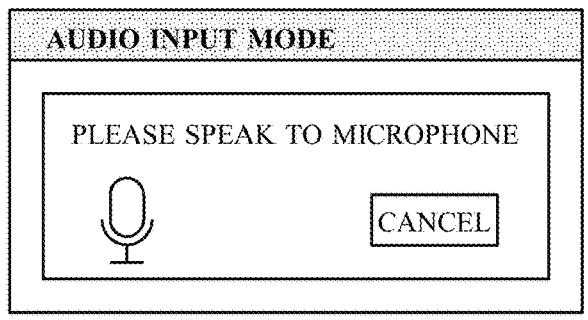
FIG. 6 illustrates one example of an electronic mail operation screen displayed on the display unit of the vehicle-mounted device.
Figure 7:
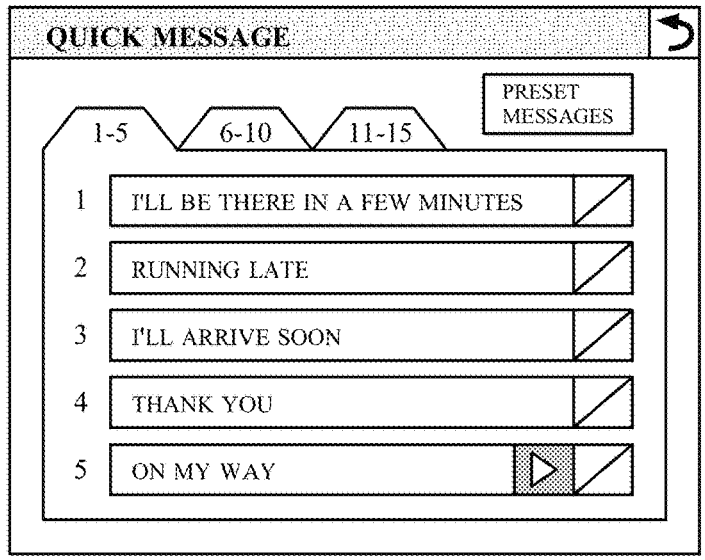
FIG. 7 illustrates one example of an electronic mail operation screen displayed on the display unit of the vehicle-mounted device.

FIG. 4 is a flowchart showing a procedure of processing performed by the vehicular information processing system according to one embodiment of the present invention. FIG. 5, FIG. 6, and FIG. 7 illustrate examples of electronic mail operation screens displayed on the display unit 116 of the vehicle-mounted device 10.

For example, a situation is assumed in which, as a result of the aforementioned functions (1) and (2) of the MAP being performed, the contents of an electronic mail are displayed on the screen of the display unit 116 of the vehicle-mounted device 10, as illustrated in FIG. 5. In this situation, in the case of replying to this electronic mail, the driver, etc., inputs an e-mail reply instruction into the vehicle-mounted device 10 by touching the "REPLY" button displayed on the screen of the display unit 116. The e-mail reply instruction may be inputted by the voice of the driver saying "reply" with the use of the audio recognition function. When the e-mail reply instruction is received, a message to be included in an e-mail is generated by the vehicle-mounted device 10. This message may be generated by the audio control unit 112 performing the process of recognizing the voice of the driver through the screen (audio input mode) illustrated in FIG. 6 or may be generated by the display control unit 113 performing the process of selection from predetermined messages through the screen (quick message) illustrated in FIG. 7. The message generated in this manner is outputted to the electronic mail processing unit 111 together with the e-mail transmission instruction.

In FIG. 4, when an electronic mail transmission instruction is received (step S401, Yes), the electronic mail processing unit 111 refers to the information in the information storage unit 14 (step S402) and determines whether or not the mobile device 20 that is wirelessly connected at the moment is equipped with the MAP e-mail transmitting function (step S403).

a. Case where the Mobile Device 20 is Equipped with e-Mail Transmitting Function In the case where the mobile device 20 is equipped with the e-mail transmitting function (step S403, Yes), the electronic mail processing unit 111 of the vehicle-mounted device 10 instructs the text generating unit 15 to generate text data corresponding to the message. On the basis of this instruction, the text generating unit 15 generates text data, for e-mail transmission, corresponding to the message (step S404). The generated text data for e-mail transmission is sent to the communication unit 13 and transmitted from the vehicle-mounted device 10 to the outbox folder in the mobile device 20 (step S405).

The communication unit 23 of the mobile device 20 receives the text data, for e-mail transmission, transmitted (uploaded) by the vehicle-mounted device 10 and stores the text data for e-mail transmission into the outbox folder generated in advance (step S408). Then, the electronic mail processing unit 211 generates an electronic mail on the basis of the text data, for e-mail transmission, stored in (uploaded to) the outbox folder and transmits the generated electronic mail to the external network (step S411).

b. Case where the Mobile Device 20 is not Equipped with e-Mail Transmitting Function In the case where the mobile device 20 is not equipped with the e-mail transmitting function (step S403, No), the electronic mail processing unit 111 of the vehicle-mounted device 10 instructs the activation operating unit 16 to output the operation signal for activating the text generating unit 22 of the mobile device 20. On the basis of this instruction, the activation operating unit 16 generates an operation signal (start-up signal) for starting up the audio recognition unit 221 mounted in the mobile device 20 (step S406). This start-up signal is sent to the communication unit 13 and then transmitted from the vehicle-mounted device 10 to the mobile device 20 according to another Bluetooth communication protocol (step S407).

The mobile device 20 receives the start-up signal transmitted from the vehicle-mounted device 10 (step S409). Then, the mobile device 20 starts up the audio recognition unit 221 according to the start-up signal and generates the text data for e-mail transmission according to sound inputted to the mobile device 20 (step S410). Specifically, the audio recognition unit 221 recognizes the sound inputted from the outside of the mobile device 20 through a microphone (not illustrated in the drawings) and generates the text data for e-mail transmission from the recognized sound (step S410). The sound inputted to the mobile device 20 may be in any format by which the audio recognition unit 221 can perform recognition. For example, the sound may be the voice of the driver him/herself (who has recognized that the mobile device 20 is not equipped with the e-mail transmitting function) or may be sound outputted from the audio output unit of the vehicle-mounted device 10. In other words, in the vehicle-mounted device 10, the audio control unit 112 may generate audio data corresponding to an e-mail message for transmission, and the audio data may be outputted as the sound from the speaker 114. The text data, for e-mail transmission, generated by the audio recognition unit 221 is outputted to the electronic mail processing unit 211. The electronic e-mail processing unit 211 generates an electronic mail on the basis of the text data, for e-mail transmission, received from the audio recognition unit 221 and transmits the generated electronic mail to the external network (step S411).

In the processing described above, the process steps of steps S401 to S407 are performed by the vehicle-mounted device 10, and the process steps of steps S408 to S411 are performed by the mobile device 20.

In some cases, the audio data corresponding to the message may be transmitted from the vehicle-mounted device 10 to the mobile device 20 using another Bluetooth communication protocol or a communication protocol other than Bluetooth. In these cases, the vehicle-mounted device 10 may transmit the audio data corresponding to the message to the audio recognition unit 221 of the mobile device 20.

Furthermore, the text data, for e-mail transmission, which is generated by the audio recognition unit 221 may include all of the recipient's e-mail address, title, and message contents of the electronic mail or may be only the message contents. In the situation in which an e-mail is transmitted in reply to the received e-mail as illustrated in the present embodiment, the recipient's e-mail address and the response title (for example, "Re:" may be added at the beginning of the title) are known. Thus, the audio recognition unit 221 may generate only the message contents through the audio recognition process, and the electronic mail processing unit 211 of the mobile device 20 may be caused to generate the recipient's address and the response title, or the vehicle-mounted device 10 may transmit the recipient's address and the response title to the mobile device 20 using another Bluetooth communication protocol or a communication protocol other than Bluetooth.

Furthermore, the audio recognition unit 221 of the mobile device 20 may be started up by sound. In this case, the vehicle-mounted device 10 may, instead of causing the activation operating unit 16 to generate the start-up signal for the audio recognition unit 221, cause the audio control unit 112 to generate audio data for starting up the audio recognition unit 221 of the mobile device 20 and outputs the audio data as sound from the speaker 114.

Effect and Advantage of Embodiment

As in the present embodiment described above, in the vehicular information processing system in which the vehicle-mounted device 10 and the mobile device 20 are connected and communicate with each other using the Bluetooth MAP communication protocol, the vehicle-mounted device 10 starts up the audio recognition unit 221 mounted in the mobile device 20 when the mobile device 20 is not equipped with the e-mail transmitting function specified in the MAP communication protocol. Then, the vehicle-mounted device 10 conveys a necessary message (the text data for e-mail transmission) to the mobile device 20 via the audio recognition function of the audio recognition unit 221. This enables the vehicle-mounted device 10 to transmit an electronic mail containing the necessary message to the external network even when the mobile device 20 is not equipped with the e-mail transmitting function. Accordingly, the convenience for providing electronic mail messages (text data for e-mail transmission) from the vehicle-mounted device 10 to the mobile device 20 improves.

Application Example

The above-described embodiment describes the process of transmitting an electronic mail from the vehicle-mounted device 10 to the external network via the mobile device 20 as a specific example of the process performed by the vehicle-mounted device 10 on the mobile device 20. In addition to this example, useful operations provided by the present invention can be applied to various processes performed by the vehicle-mounted device 10 on the mobile device 20.

For example, useful operations provided by the present invention can be applied also to so-called schedulers/reminders which manage users' schedules and plans and make notification thereof. In this case, for example, a situation is assumed in which schedule contents (text data or the like) generated by the vehicle-mounted device 10 are added to a scheduler in the mobile device 20. In such a situation, when the mobile device 20 is not equipped with a function of receiving the schedule contents from the vehicle-mounted device 10 and interpreting the schedule contents, the use of the audio recognition function incorporated in the mobile device 20 enables the vehicle-mounted device 10 to easily convey the schedule contents to the mobile device 20. Accordingly, the convenience for providing schedules or plans (text data) from the vehicle-mounted device 10 to the mobile device 20 improves.

INDUSTRIAL APPLICABILITY

The present invention can be used for a system in which a mobile device and a vehicle-mounted device are connected according to a predetermined communication protocol and is useful especially in the case where the convenience for providing text data for e-mails, from the vehicle-mounted device to the mobile device, needs to improve, for example.

DESCRIPTION OF THE REFERENCE CHARACTERS 10 vehicle-mounted device
11 control unit
111 electronic mail processing unit
112 audio control unit
113 display control unit
114 speaker
115 microphone
116 display unit
117 input unit
12 processing unit
13 communication unit
14 information storage unit
15 text generating unit
16 activation operating unit
20 mobile device
21 control unit
211 electronic mail processing unit
22 text generating unit
221 audio recognition unit
23 communication unit

The invention claimed is:
1. A vehicular information processing system comprising:
a vehicle-mounted device; and
a mobile device, wherein
the vehicle-mounted device and the mobile device are connected using a communication protocol,
the vehicle-mounted device includes:
a storage unit that stores information indicating whether or not the mobile device is equipped with an e-mail transmitting function specified in the commu- nication protocol, wherein the email transmitting function allows the mobile device to:
  receive, from the vehicle mounted device, a first text data generated by the vehicle-mounted device;
  receive, from the vehicle-mounted device, a first request to transmit the first text data in electronic mail format from the mobile device to an external network; and
  transmit the first text data in electronic mail format to the external network when the mobile device receives the first request from the vehicle-mounted device; and
a control unit configured to:
  determine, when an instruction for transmitting an e-mail from the mobile device is received at the vehicle-mounted device, whether or not the mobile device is equipped with the e-mail transmitting function, on the basis of the information in the storage unit,
  transmit the first text data, generated by the vehicle-mounted device, to the mobile device, and transmits to the mobile device the first request to generate a first electronic mail according to the first text data and to transmit the first electronic mail to an external network from the mobile device when the mobile device is equipped with the e-mail transmitting function, and
  transmit to the mobile device a second request to generate a second text data in the mobile device when the mobile device is not equipped with the e-mail transmitting function, and transmit to the mobile device instructions to generate a second electronic mail in the mobile device according to the second text data generated in the mobile device and to transmit the second electronic mail to the external network from the mobile device, and
the mobile device includes a mobile control unit configured to:
  generate the second text data according to the second request; and
  transmit, to the external network, the second electronic mail based on the second text data.

2. The vehicular information processing system according to claim 1, wherein the mobile device includes an audio recognition function and generates the second text data for e-mail transmission by performing a process of recognizing sound inputted from outside of the mobile device.

3. The vehicular information processing system according to claim 2, wherein the control unit is further configured to:
  convert the second text data to audio and output the audio, and
  output sound recognizable through the audio recognition function of the mobile device as the second text data, to be provided to the mobile device, when the mobile device is not equipped with the e-mail transmitting function.

4. The vehicular information processing system according to claim 1, wherein the communication protocol is a MAP communication protocol based on a Bluetooth standard.

5. The vehicular information processing system according to claim 2, wherein the communication protocol is a MAP communication protocol based on a Bluetooth standard.

6. The vehicular information processing system according to claim 3, wherein the communication protocol is a MAP communication protocol based on a Bluetooth standard.

7. A vehicle-mounted device which connects to a mobile device using a communication protocol, the vehicle-mounted device comprising:
  a storage unit that stores information indicating whether or not the mobile device is equipped with an e-mail transmitting function specified in the communication protocol, wherein the email transmitting function allows the mobile device to:
    receive, from the vehicle mounted device, a first text data generated by the vehicle-mounted device;
    receive, from the vehicle-mounted device, a first request to transmit the first text data in electronic mail format from the mobile device to an external network; and
    transmit the first text data in electronic mail format to the external network when the mobile device receives the first request from the vehicle-mounted device; and
  a control unit configured to:
    determine, when an instruction for transmitting an e-mail from the mobile device is received at the vehicle-mounted device, whether or not the mobile device is equipped with the e-mail transmitting function, on the basis of the information in the storage unit;
    transmit the first text data, generated by the vehicle-mounted device, to the mobile device, and transmit to the mobile device the first request to generate a first electronic mail according to the first text data and to transmit the first electronic mail to an external network from the mobile device when the mobile device is equipped with the e-mail transmitting function, and
    transmit instructions to the mobile device for starting up an audio recognition function incorporated in the mobile device when the mobile device is not equipped with the e-mail transmitting function; and
    output sound recognizable through the audio recognition function of the mobile device as a second text data, to be provided to the mobile device, when the mobile device is not equipped with the e-mail transmitting function.

8. A method for providing text data for e-mail transmission, the method being performed in a vehicular information processing system in which a vehicle-mounted device and a mobile device are connected using a communication protocol, wherein the vehicle-mounted device performs steps of:
  obtaining, from the mobile device, information indicating whether or not the mobile device is equipped with an e-mail transmitting function specified in the communication protocol, and storing the information in a storage unit;
  wherein the email transmitting function allows the mobile device to:
    receive, from the vehicle mounted device, a first text data generated by the vehicle-mounted device;
    receive, from the vehicle-mounted device, a first request to transmit the first text data in electronic mail format from the mobile device to an external network; and
    transmit the first text data in electronic mail format to the external network when the mobile device receives the first request from the vehicle-mounted device;
  detecting that an instruction for transmitting an e-mail from the mobile device is received by the vehicle-mounted device;

determining, when detecting the instruction, whether or not the mobile device is equipped with the e-mail transmitting function, on the basis of the information in the storage unit;

transmitting the first text data, generated by the vehicle-mounted device, to the mobile device, and transmitting to the mobile device the first request to generate a first electronic mail according to the first text data and to transmit the first electronic mail to an external network from the mobile device when determining that the mobile device is equipped with the e-mail transmitting function; and transmitting to the mobile device a second request to generate a second text data in the mobile device and to generate a second electronic mail in the mobile device according to the second text data and to transmit the second electronic mail to the external network from the mobile device, when determining that the mobile device is not equipped with the e-mail transmitting function, and the mobile device performs the steps of:

generating the second text data according to the second request; and transmitting, to the external network, the second electronic mail based on the generated second text data.

9. A non-transitory computer-readable medium programmed to cause a computer of the vehicle-mounted device and the mobile device perform the method for providing text data for e-mail transmission according to claim 8.

* * * * *